United States Patent [19]

Ernst et al.

[11] Patent Number: 4,843,960

[45] Date of Patent: Jul. 4, 1989

[54] TYPE CARRIER SET FOR A STAMP PRINTING MECHANISM AND METHOD FOR ASSEMBLING A STAMP PRINTING MECHANISM USING SUCH A TYPE

[75] Inventors: Gottfried Ernst, Rothenberg; Friedrich Oess, Eberbach, both of Fed. Rep. of Germany

[73] Assignee: Esselte Meto International GmbH, Hirschhorn, Fed. Rep. of Germany

[21] Appl. No.: 188,685

[22] Filed: Apr. 27, 1988

Related U.S. Application Data

[63] Continuation of Ser. No. 871,832, Jun. 9, 1986, abandoned.

[30] Foreign Application Priority Data

Jun. 18, 1985 [DE] Fed. Rep. of Germany ....... 3521701

[51] Int. Cl.[4] ......................... B41J 1/60; C04B 41/00; B32B 31/00

[52] U.S. Cl. .................................... 101/111; 101/105; 101/372; 400/146; 264/132; 264/139; 264/159; 29/418

[58] Field of Search ............... 101/105, 110, 111, 372, 101/375, DIG. 27; 400/146; 264/129, 132, 139, 159; 29/418

[56] References Cited

U.S. PATENT DOCUMENTS

| | | | |
|---|---|---|---|
| 3,159,101 | 12/1964 | Dziekan | 101/111 |
| 3,418,929 | 12/1968 | Nelson | 101/111 |
| 3,559,802 | 2/1971 | Eidus | 29/418 X |
| 4,387,644 | 6/1983 | Jenkins | 101/111 |
| 4,457,230 | 7/1984 | Kurihara et al. | 101/110 |
| 4,458,589 | 7/1984 | Watanabe et al. | 101/110 |
| 4,578,857 | 4/1986 | Gray et al. | 29/418 X |
| 4,586,432 | 6/1986 | Volk | 101/105 X |
| 4,617,849 | 10/1986 | Ligon | 264/159 X |

FOREIGN PATENT DOCUMENTS

| | | | |
|---|---|---|---|
| 379111 | 11/1985 | Austria | 101/105 |

*Primary Examiner*—Charles Pearson
*Assistant Examiner*—James R. McDaniel
*Attorney, Agent, or Firm*—Gerald J. Ferguson, Jr.

[57] ABSTRACT

A type carrier set (10) for a stamp printing mechanism is described which comprises a plurality of type carriers (12) which carry print types (22) at their outer surface in consecutive fields (16). The type carriers (12) are disposed parallel adjacent each other in the order necessary for use in the stamp printing mechanism. The adjacently disposed type carriers (12) are connected together by connecting webs (28) adapted to be sheared off. In the method according to the invention for assembly the stamp printing mechanism using a type carrier set according to the invention in which the type carriers are endless bands, the type bands connected together are separated from each other consecutively in each case on turning for the first time of the setting shaft by shearing off the connecting webs (28).

2 Claims, 3 Drawing Sheets

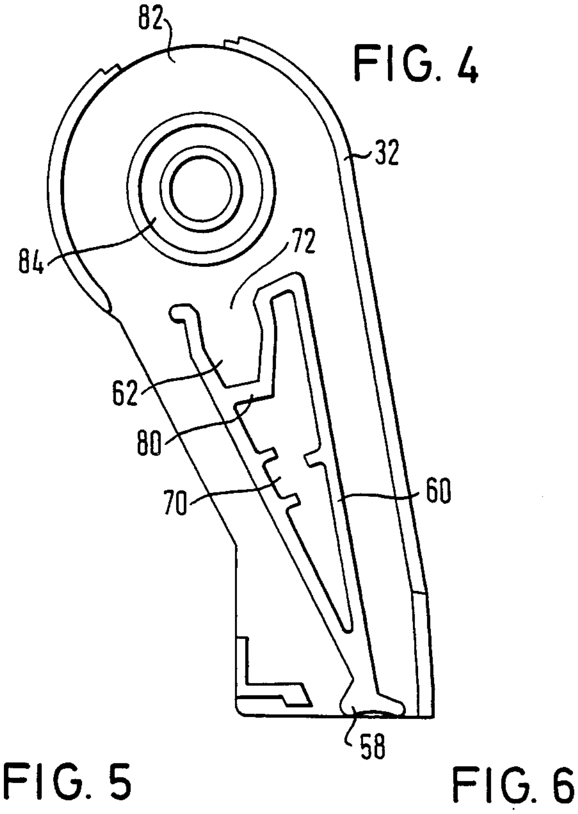
FIG. 4
FIG. 5
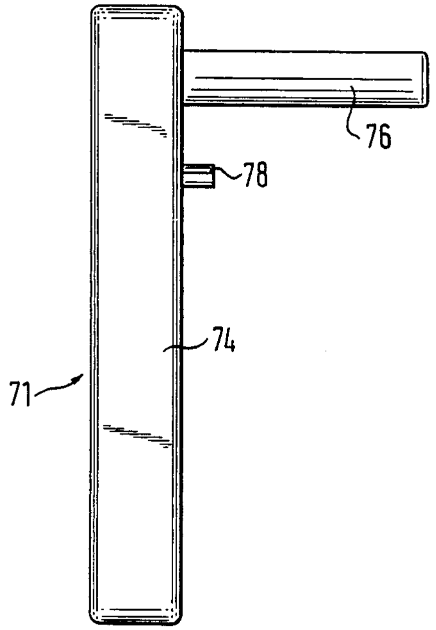
FIG. 6
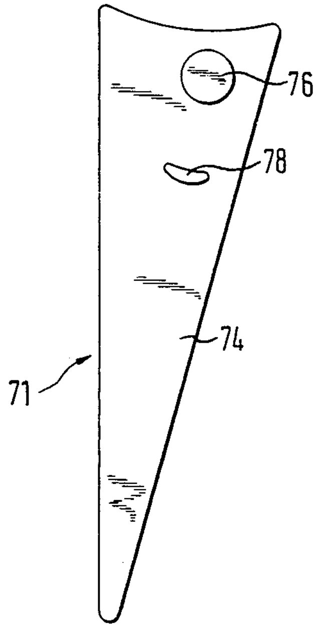

TYPE CARRIER SET FOR A STAMP PRINTING MECHANISM AND METHOD FOR ASSEMBLING A STAMP PRINTING MECHANISM USING SUCH A TYPE

This application is a continuation of Ser. No. 871,832, filed 6/9/86, now abandoned.

The invention relates to a type carrier set according to the preamble of claim 1 and to a method of assembling a stamp printing mechanism using such a type carrier set.

In stamp printing mechanisms the print types are disposed in consecutive fields on the outer surface of type carriers. In every stamp printing mechanism there is a type carrier set consisting of a plurality of individual type carriers. A type carrier set contains as a rule several identical type carriers with which the digits 0 to 9 and symbols such as a full stop, a dash or a stroke can be printed, and one or more further type carriers with which currency information such as "DM" or the like can be printed. The type carriers are generally kept available in storage boxes and for assembling the stamp printing mechanism the type carriers are removed from the storage boxes and assembled to give the type carrier set necessary for the printing mechanism. The individual type carriers of the set may then be inserted consecutively individually into the printing mechanism to be assembled. The individual insertion of the type carriers into the printing mechanism to be assembled is a time-consuming operation in which moreover there is a danger of the various types of type carriers being mixed up so that with a finished printing mechanism the desired imprints cannot be produced because the type carriers for example have been inserted in the wrong order.

The invention is based on the problem of making a type carrier set of the type outlined in such a manner that from the start up to installation in a stamp printing mechanism it is easy to manipulate and saves time.

The problem underlying the invention is solved with the features set forth in the characterizing clause of claim 1. The method according to the invention for assembling a stamp printing mechanism using the type carrier set according to the invention is set forth in the characterizing clause of claim 1.

In the type carrier set according to the invention the individual type carriers are not separated loosely from each other but hang together on connecting webs which can be sheared off. The entire type carrier set can therefore be treated as a unit and as such also inserted on assembly into the appropriate housing half of the stamp printing mechanism. Since the type carriers in the carrier set are already arranged in the order necessary for use in the stamp printing mechanism it is not possible to mix up the individual type carriers and this facilitates the assembly.

Further advantageous developments of the invention are characterized in the subsidiary claims.

Figure 2:
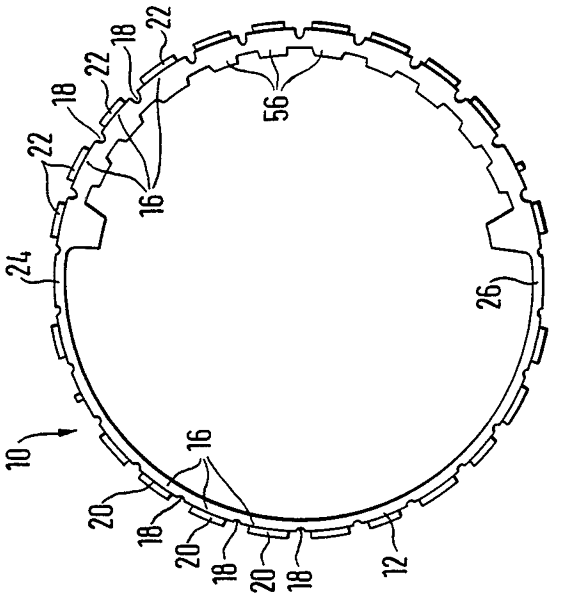
Figure 1:
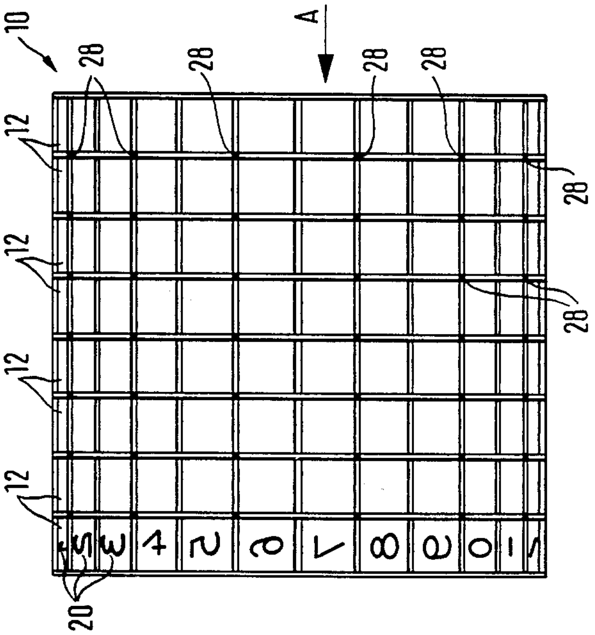
Figure 3:
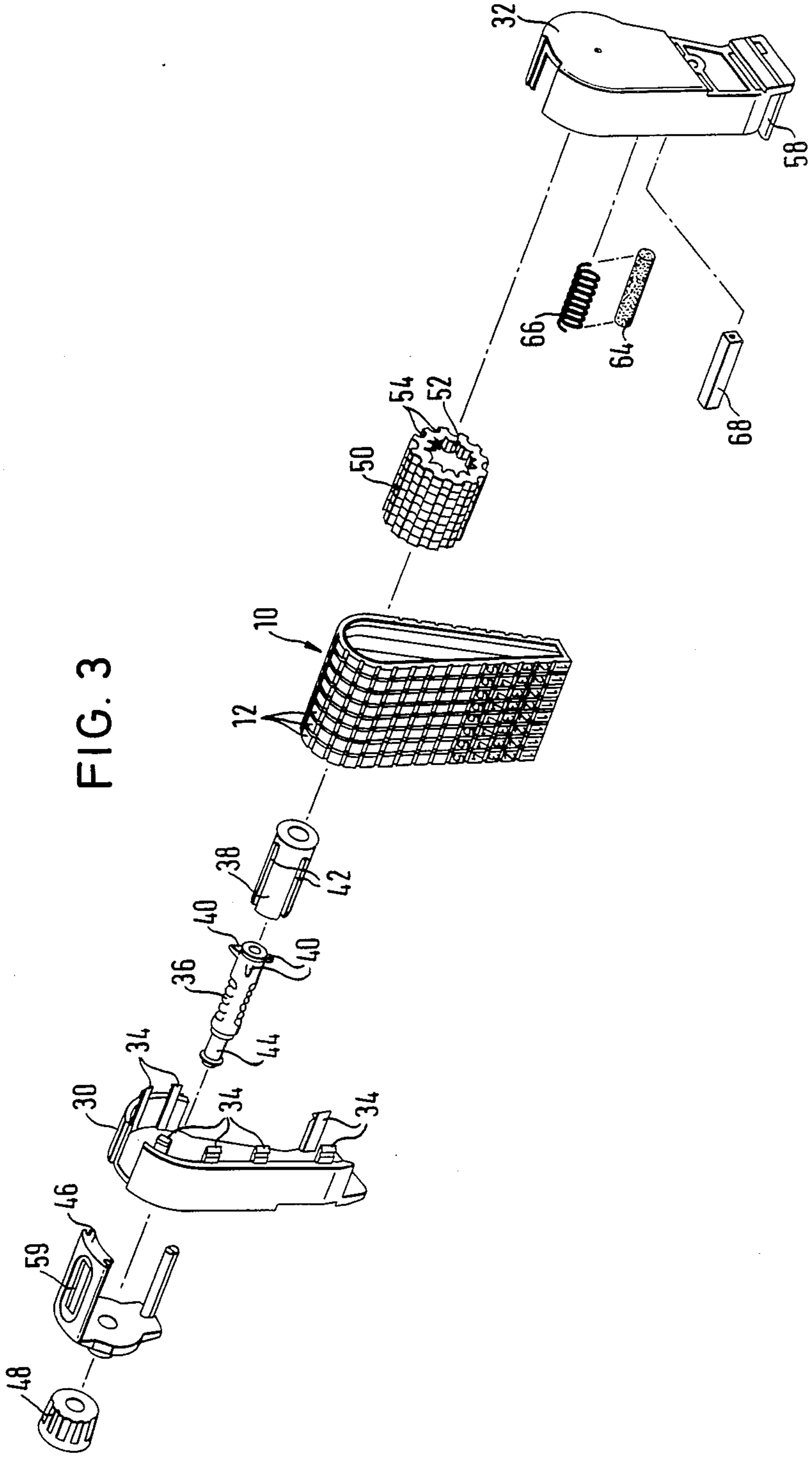

The invention will be explained by way of example with the aid of the drawings, wherein:

FIG. 1 is a front view of the type carrier set according to the invention,

FIG. 2 is a side view of the type carrier set of FIG. 1 observed in the direction of the arrow A of FIG. 1, FIG. 3 is an exploded view of a stamp printing mechanism for explaining a method for its assembly using the type carrier set of FIGS. 1 and 2, FIG. 4 is an inner view of the housing half shown on the right in FIG. 3, FIG. 5 is a side view of an assembly tool and FIG. 6 is a view of the assembly tool of FIG. 5 seen from the right.

The type carrier set explained hereinafter with the aid of the drawings consists of a plurality of movable endless type bands but could also be made up of rigid type wheels connected together like the bands by shearable connecting webs.

The type carrier set 10 illustrated in FIG. 1 includes eight type bands 12. This means that with this type carrier set 10 characters having up to eight positions can be printed. On the type band lying furthest to the left print types 20 for the digits 1, 2, 3 . . . 0 and for a hyphen or stroke can be seen. For printing price information the first three type bands from the left may be identical whilst behind each number of the fourth type band from the left there is a decimal point which separates the Mark amounts from the Pfennig amounts. The fifth and sixth type band from the left are again formed like the first left type band shown. The two type bands furthest to the right may carry as print types either small print types used as code numbers or also currency information such as "DM".

The specific composition of the type carrier set of FIG. 1 outlined is only an example; any other desired orders of the type bands with any print types may also be selected.

As apparent from the side view of FIG. 2 the outer peripheral face of the type bands is divided into equilength fields 16 between which there are grooves 18. Each field 16 of the left half of each type band 12 in FIG. 2 carries a print type 20. Each field 16 of the right half of each type band 12 in FIG. 2 carries a plain character 22 which corresponds exactly to the diametrically opposite print type. Between the two field groups bearing types 20 and plain characters 22 there are two blank fields 24 and 26.

The type bands 12 of the type carrier set 10 are connected at connecting webs 28 which hold the type bands 12 together in the parallel arrangement illustrated. Said connecting webs 28 are disposed at the grooves 18 provided between the fields 16. To be more exact, the connecting webs 28 extend between the bottom of the groove of a type band 12 and the bottom of the groove of the adjacent type band 12. It is however also possible to use another position of the connecting webs. The individual type bands 12 form due to the connection via the connecting webs 28 a hose-like structure whose width corresponds subtantially to eight times the width of the type band. The spacings between the individual type bands 12 are shown in FIG. 1 substantially greater than in reality to make the connecting webs clear in the drawing. In fact, the side faces of the individual type bands 12 lie substantially closer to each other.

The provision of the connecting webs 28 between the type bands 12 substantially facilitates assembly of a stamp printing mechanism for which the type carrier set 10 is intended. Such a stamp printing mechanism is illustrated in exploded view in FIG. 3 with its essential details.

The stamp printing mechanism includes two housing halves 30 and 32 which can be connected together via snap-action hooks 34. In the housing half 30 a setting shaft 36 is rotatably mounted via which a slit sleeve 38 is shifted. Driver teeth 40 disposed at the end of the setting shaft 36 engage through slots 42 in the sleeve 38 beyond the outer periphery thereof. On the end portion 44 of the setting shaft 36 there is a window support 46 and an actuating knob 48 with the aid of which the setting shaft 36 can be turned and axially displaced. On displacement of the setting shaft 36 the window support 46 is also axially displaced and the driver teeth 40 slide axially along the slots 42 in the sleeve 38. Mounted on the sleeve 38 are eight setting wheels 50 which at their inner peripheral surface have grooves 52 into which the driver teeth 40 of the setting shaft 36 engage. By axial displacement of the setting shaft 36 the driver teeth 40 can each be brought into engagement with grooves 52 of a setting wheel 50. In this manner by turning the actuating knob 48 in succession each of the setting wheels 50 can be turned. The setting wheels 50 are provided at their outer peripheral face also with grooves 54 into which engage projections 56 disposed at the inner peripheral surface of the type bands 12. In this manner the type bands can be moved via the engagement between the driver teeth 40 and the grooves 52 and the engagement between the grooves 54 and the projections 56.

The type bands 12 of the type carrier set 10 are placed in the printing mechanism round the setting wheels 50 and also engage round a print web 58 disposed at the lower end face of the housing half 32. The print type 20 disposed beneath the print web 58 generates the desired imprint in each case. The corresponding plain character 22 is then visible through a window 59 in the window support 56. The print web 58 is attached at the lower end of a support element 60 connected integrally to the housing half 32. At its upper end the support element 60 comprises a dish-like recess 62 in which a rubber strip 64 and a helical spring 66 are disposed. The rubber strip 64 and the helical spring 66 have together a height such that the helical spring 66 projects upwardly out of the recess 62 and comes into contact with the setting wheels disposed thereabove. The helical spring 66 exerts a limited retaining force on the setting wheels which opposes the rotation thereof. When a setting wheel is turned by turning the setting shaft 36 by means of the actuating knob 48, the operator feels a detent force which must be overcome in each case in order to adjust a type band stepwise so that one print type after the other comes to lie beneath the print web 58. By means of a square member 68 which is inserted into a recess 70 in the support element 60 and the width of which corresponds to the internal width of the two housing halves 30 and 32 the stamp printing mechanism can for example be screwed to the printing mechanism support of a hand labelling device. The corresponding screws not illustrated in FIG. 3 can be inserted through holes in the housing halves 30 and 32 and screwed into threaded bores in the ends of the square member 68.

Below, the assembly of the printing mechanism illustrated in FIG. 3 using the type carrier set of FIGS. 1 and 2 will be described.

In the purely manual assembly firstly the setting shaft 36 is inserted through a corresponding opening in the housing half 30, whereupon the window support 46 is pushed over the end portion 44 of the setting shaft 36. Thereafter, the actuating knob 48, which consists of a rubber-like material, is also pushed over the end portion 44 so that the window support 46 is secured on the setting shaft 36. The setting shaft 36 can be displaced by means of the actuating knob together with the window support 46 axially in the opening in the housing half 30. A complete withdrawal from the housing half 30 is however not possible because of the driver teeth 40. For preparing the further assembly the sleeve 38 is pushed over the setting shaft 36, ensuring that the driver teeth 40 slide along in the slots 32 of the sleeve 38.

Then the rubber strip 64, the helical spring 66 and the square member 68 are inserted into the recesses 62 and 70 provided for this purpose in the housing half 32. The housing half 32 is held when this is done in a holder so that the inner side shown in FIG. 4 projects upwardly.

As mentioned above, in the assembled state of the printing mechanism the helical spring 66 is in contact with the grooves 54 at the periphery of the setting wheels 50. To ensure that the helical spring 66 does not interfere with the insertion of the setting wheels into the housing half 32 they are pressed by means of an assembly tool 71 into the recess 62 in such a manner that they do not project beyond the opening region 72 thereof. Said assembly tool 71 is illustrated in FIGS. 5 and 6. It consists of a grip portion 74 on which a pin 76 and a detent stud 78 are disposed. The pin 76 is introduced into the interior of the helical spring 66, whereupon the helical spring 66 is pressed against the rubber strip 64 so that it no longer projects beyond the opening region 72. The detent stud 78 is spaced from the pin 76 a distance such that in the compressed condition of the rubber strip it engages beneath the bottom 80 of the recess 62. As a result, even after release of the grip member 74 the rubber strip 64 remains compressed so that the helical spring 66 no longer projects beyond the opening region 72 of the recess 62.

The individual setting wheels are now stacked on a corresponding receiving pin in a number corresponding to the number of type bands 12 to be used. The type carrier set 10 is placed round the stack of the setting wheels 50. The operator then grips the type carrier set 10 in the region in which it bears on the periphery of the stacked setting wheels 50 so that he can then move the entire stack together with the type carrier set 10 to the housing half 32. The type carrier set 10 and the stack of the setting wheels is inserted into the housing half 32 in such a manner that the setting wheels come to lie in the region of the annular space 82 apparent in FIG. 4 in the upper portion of the housing half 32. At the diametrically opposite end the type bands 12 of the band set 10 are are placed round the print web 58. Thereafter the assembly tool 71 is removed from the housing half 32 so that the rubber strip 64 relaxes and brings the periphery of the helical spring 66 into contact with the setting wheels 50.

The preassembled housing half 30 is now fitted onto the housing half 32, ensuring that the driver teeth 40 projecting outwardly from the slots 42 of the sleeve 38 engage in grooves 52 of the inner peripheral face of the setting wheels 50. On complete pushing together of the two housing halves 30 and 42 the end of the sleeve 38 at which the slots 42 are closed comes to lie in the annular groove 84 disposed in the housing half 32, providing a mounting for the sleeve 38. The snap-action hooks 34 finally engage in corresponding recesses, not illustrated, in the housing half 32 so that the housing halves 30 and 32 are fixedly held together.

The assembly of the printing mechanism illustrated in FIG. 3 is thus completed.

The assembly of the printing mechanism outlined was completely manual but individual steps of the assembly or even the entire assembly can be carried out automatically. A first step in the automation may reside in that the setting wheels 50 are arranged above each other automatically in a special device for forming the necessary stack and that the type carrier set 10 is placed round said stack. Furthermore, it is then possible to tension the type carrier set 10 after placing round the stack of setting wheels 50 into the form shown in FIG. 3 so that it can be inserted with the aid of a corresponding transfer tool into the housing half 32. The transfer tool may comprise a mandrel which engages in the interior of the helical spring 66 and on introduction of the setting wheels and type band set into the housing half 32 presses said spring into the recess 62 and against the rubber strip 64 so that it does not obstruct the insertion of the type wheels 50. The preassembled housing half 30 can then as before be assembled either manually or automatically with the housing half 32.

The result of the assembly method outlined is a printing mechanism having all the individual components illustrated in FIG. 3 but it is not yet functionable because in the inserted type carrier set 10 the individual type bands are still connected together by the shearable connecting webs 28. To establish functionability the individual type bands 12 of the type carrier set 10 must first be separated from each other. This is done in that the driver teeth 40 of the setting shaft 36 are brought consecutively into a drive connection with all the setting wheels 50 and that by means of the actuating knob 48 the setting wheel 50 with which the driver teeth 40 are in connection at that instant is turned. By this rotational movement the connecting webs 28 between the type band 12 placed round the setting wheel 50 just turned and the adjacent type band is sheared off so that the type band 12 just moved can be freely entrained with the driven setting wheel 50. It was mentioned in the outline of the assembly of the stamp printing mechanism that the helical spring 66 with the aid of the rubber strip 64 exerts on the setting wheels a limited retaining force which counteracts their rotation. When at the end of the assembly operation the connecting webs are sheared off by turning the setting shaft 36, this retaining force ensures that further type bands 12 are not entrained, which would prevent the desired shearing off. Because of the retaining force the setting wheels 50 and the type bands 12 engaging therewith which are adjacent the particular setting wheel 50 to be turned remain stationary so that the force necessary for the shearing off can be exerted on the connecting webs. If however the retaining force is not adequate the person carrying out the shearing off can also simply hold the adjacent type bands firmly with his fingers. In this manner in succession all the connecting webs 28 are sheared off until finally all the type bands 12 are separate from each other and can be moved individually. After this step has been carried out the printing mechanism is fully functionable like a printing mechanism in which the type bands were already separate from each other when inserted.

The remnants of the connecting webs 28 remaining on the type bands 12 have several advantageous effects. They ensure that between the type bands 12 a certain spacing is maintained which makes special spacers as hitherto used in stamp printing mechanisms superfluous. The web remnants prevent the type bands being displaced on the setting wheels and thereby possibly coming into engagement with an adjacent setting wheel which would result in two type bands moving simultaneously when one band is to be adjusted by means of the setting shaft. Maintaining the spacings between the type bands also gives a good print image of the imprints to be made by the printing mechanism because uniform spacings are achieved between the individual characters.

We claim:

1. A method of assembling a stamp printing mechanism using a type carrier set, the type carrier set comprising a plurality of endless type carriers which at their outer surface in consecutive fields carry print types, the type carriers being disposed so as to be parallel adjacent each other in a predetermined order for use in the stamp printing mechanism, adjacent ones of the type carriers being connected together by shearable connecting webs, the type carriers being endless bands, the stamp printing mechanism having two housing halves, of which one supports rotatably and axially displaceably a setting shaft which can be brought by at least one driver member into a drive connection with setting wheels which in turn are in a drive connection with the type bands for adjustment thereof, a stack of setting wheels being placed about the stack of setting wheels such that a portion of the inner peripheral surface of each type band comes into engagement with a portion of the outer peripheral surface of a setting wheel, the stack of setting wheels being inserted with the type carrier set into one of the housing halves, and after assembly of the housing halves the driver member being brought by axial displacement of the setting shaft consecutively into a drive connection with in each case one setting wheel; and by turning of the setting shaft via the drive connection through the driver member and the drive connection between the respective setting wheel and the associated type band, the connecting webs on said type band are sheared off.

2. A type carrier set for a stamp printing mechanism comprising a plurality of endless type carriers which at their outer surface in consecutive fields carry print types, the type carriers being disposed so as to be parallel adjacent each other in a predetermined order for use in the stamp printing mechanism, adjacent ones of the type carriers being connected together by shearable connecting webs;

a setting shaft and a plurality of setting wheels which are selectively rotatable by said setting shaft, and wherein said connecting webs are sufficiently frangible to permit breaking of said connecting webs on a selected one of said type carriers upon application of a manual torque to said setting shaft applied to a corresponding one of said setting wheels.

* * * * *